Nov. 8, 1938.  W. HARPER, JR  2,135,939
DIFFERENTIAL PRESSURE MECHANISM
Original Filed Dec. 8, 1932  2 Sheets-Sheet 1
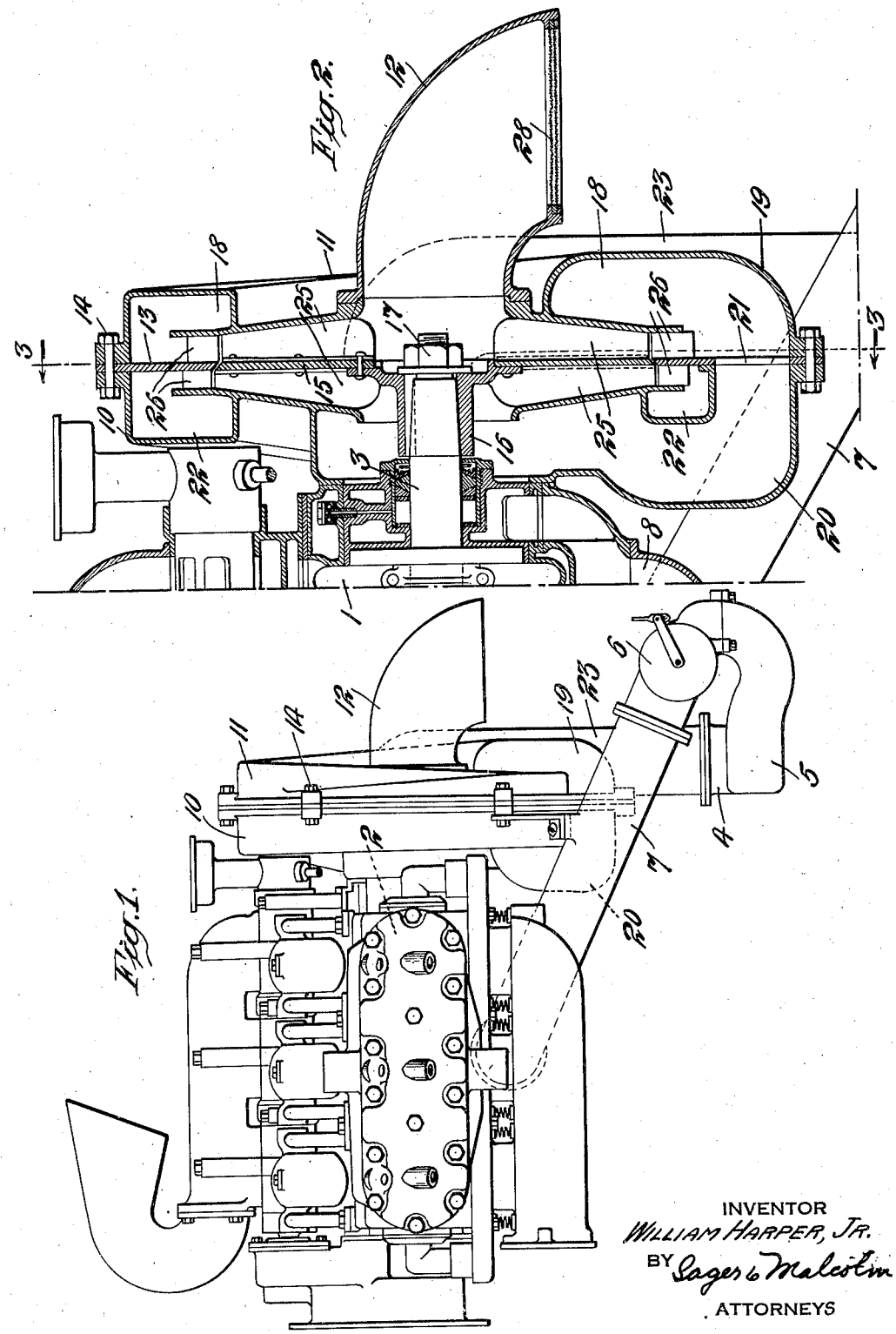
INVENTOR
WILLIAM HARPER, JR.
BY Sagers & Malcolm
ATTORNEYS

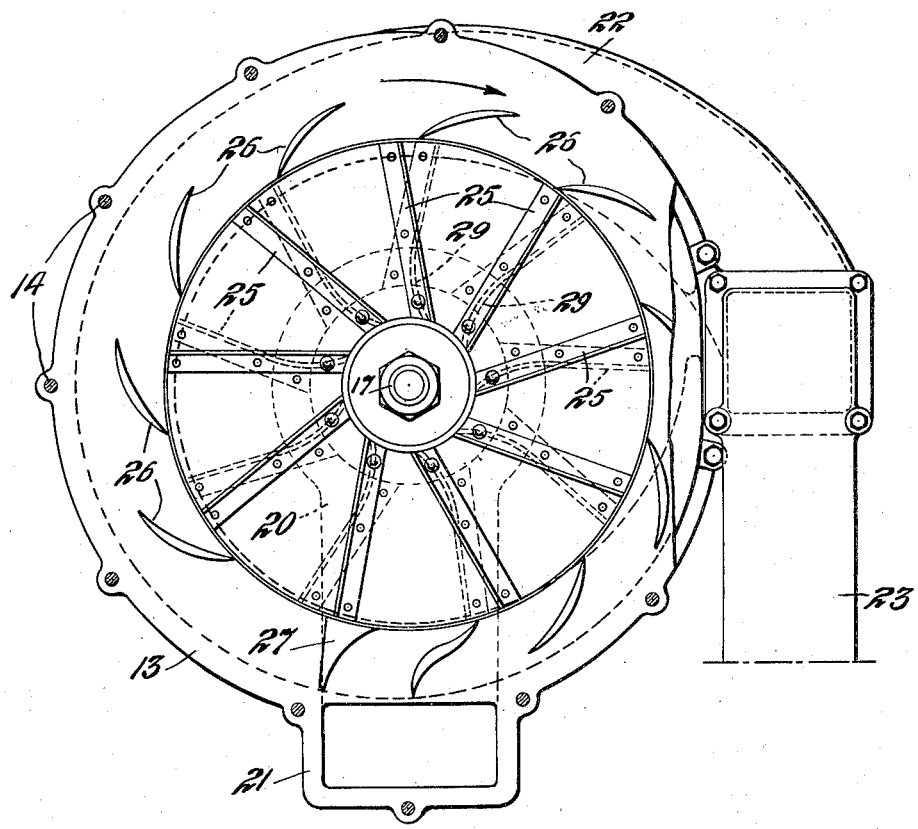

Patented Nov. 8, 1938

2,135,939

UNITED STATES PATENT OFFICE 2,135,939

DIFFERENTIAL PRESSURE MECHANISM

William Harper, Jr., Port Washington, N. Y., assignor to H. B. Motor Corporation, New York, N. Y., a corporation of New York Original application December 8, 1932, Serial No. 646,839. Divided and this application May 21, 1936, Serial No. 81,003

2 Claims. (Cl. 230—130)

This invention relates to differential pressure mechanisms and is a division of my copending application Serial No. 646,839, filed December 8, 1932, (Patent No. 2,041,709, issued May 26, 1936).

The principal object of the invention is to increase the efficiency and improve the operating characteristics of differential pressure mechanisms such as turbines, blowers of the type employed in charging combustion engines, and a variety of other mechanisms.

The various features and advantages of the invention will be described in connection with a particular embodiment shown in the accompanying drawings, wherein:

Fig. 1 is a side view of a combustion engine employing a blower constructed according to my invention;

Fig. 2 is a longitudinal section through the blower of Fig. 1; and

Fig. 3 is a vertical section taken on line 3—3 of Fig. 2.

Since the engine shown in Fig. 1 forms no part of the present invention, and is used here solely for purposes of illustration, it will not be described except to say that it is a two-cycle engine comprising a crank case 1 supporting a plurality of cylinders 2 arranged on opposite sides of a crank shaft 3.

The blower used to illustrate the differential pressure mechanism of the present invention delivers air through main 4 and branches 5 to carbureters 6 as shown in Fig. 1. The carbureters, which are two in number in the engine here referred to, have outlet pipes 7 suitably connected to opposite sides of an inlet manifold 8. For further details of the construction and operation of this engine reference is made to my above-mentioned patent.

The blower casing shown in the drawings comprises an inner plate 10 mounted on the engine frame, an outer plate 11 carrying a central air inlet funnel 12, and an annular peripheral flange 13 which is clamped between the two plates by assembling bolts 14. Crank shaft 3 extends through the center of plate 10 and carries disc or rotor 15 which is secured to the crank shaft by hub 16 and lock nut 17. Disc 15 is in the same plane as flange 13 and the adjacent peripheral surfaces or edges of the disc and flange are beveled and in close running contact with each other, being separated by an annular slot which is beveled outwardly toward the periphery of plate 10 and measures about $\frac{1}{32}$ inch from disc to flange.

The outer plate 11 of the blower is shaped to form a flat spiral chamber 18 which increases in area in a clockwise direction as viewed in Fig. 3, this being the direction of rotation of disc 15, and terminates at the large end in a depending passage 19 which mates with a corresponding depending passage 20 of plate 10. Flange 13 has a depending cut-out portion 21 to fit the juncture of passages 19 and 20. Passage 20 opens into the central portion of plate 10 adjacent the hub. Plate 10 is also shaped to form a flat spiral chamber 22 which increases in clockwise direction as viewed in Fig. 3 and terminates at the large end in a downwardly directed pipe 23 which is connected to air main 4 leading to the carbureters 6.

A plurality of impeller blades 25 are mounted on both sides of disc 15. These blades are in reasonably close contact with the dished walls of the respective plates 10 and 11 and extend out to the peripheral edge of disc 15. The stationary flange 13 carries a series of curved fins 26 on both sides, these fins being adjacent the periphery of disc 15 and curved to direct the radial blast of air through spiral chambers 18 and 22. The flange also has a curved baffle 27 adjacent the large end of chamber 18 to direct the blast of air through passages 19 and 20.

Fresh air enters the low pressure side of the blower through the mouth of funnel 12 which is preferably covered with a fine-mesh screen 28 to exclude dirt. The air drawn in by the first stage impeller blades is swirled outwardly in a radial direction and propelled through spiral chamber 18 under high velocity, thence through passages 19 and 20 to the center of the high pressure side of the blower where it is picked up by the second stage impeller blades and whirled through spiral chamber 22, outlet pipe 23, air main 4 and branch pipes 5 into carbureters 6.

The impeller blades 25 of each stage are set at angles calculated to develop maximum air velocity. In the form shown, the blades of the first stage are approximately tangent to the center of rotation, while the blades of the second stage are more nearly tangent to the hub and have their inner ends 29 sloping gradually toward the hub to scoop up the air and accelerate the velocity. The function of the tapered slot between flange 13 and disc 15 is analogous to that of a Venturi throat, air from the first stage being trapped in this slot, swirled around by the rotation of the disc and injected against the higher pressure air in the second stage, thereby increasing the pressure in the second stage while preventing leakage from the high to the low pressure stage.

Another important advantage of the foregoing construction employing differential pressures on opposite sides of the rotatable disc 15 is that it substantially eliminates vibrations of the entire structure, which vibrations are particularly detrimental in the case of high speed blowers, turbines and other differential pressure mechanisms. It is a known fact that one of the most successful ways of damping or subduing accumulative vibrations or noise is to submerge the cause of such vibrations in a fluid medium which will not respond sympathetically to the amplitude or pitch of the generated vibrations. In line with this experience I augment or compound this means in that the mechanism above described is operated within a fluid medium of two different densities, to wit: the inlet or low pressure side of the rotating impelling disc is enveloped in the fluid air in certain density or pressure which will have a sympathetic pitch to some vibrations which may become active due to the high velocity of the moving parts, but on the other or high pressure side of the same rotating disc or moving part, and in close contact with it, the fluid air has received energy and developed a greater density or pressure than on the low pressure side. Therefore the air or fluid in the second stage will not vibrate in harmony with the air in contact with the other side of the rotating disc, thereby developing a resistance instead of an accentuating characteristic to the building up of detrimental noise and vibration. In actual practice this phenomena results in almost silent operation which is highly desirable and rare in mechanisms of this kind.

It will be evident that the invention described above may be used to advantage in charging combustion engines, in turbines, and in numerous other situations, and is to be limited only by the scope of the appended claims when interpreted in view of the prior art.

The invention claimed is:

1. A differential pressure mechanism comprising a casing, a flange in said casing having an opening adjacent the periphery, a driven rotatable disc in cooperating running contact with the edge of said flange and dividing said casing into opposite low and high pressure chambers connected by said opening, said chambers being in the form of flat spirals increasing in area in the direction of rotation of said disc, and impeller blades on both sides of said disc in close running contact with the adjacent walls of said casing, the cooperating edges of said flange and disc being beveled and sloping outwardly into said high pressure chamber.

2. A differential pressure mechanism comprising a casing, a flange in said casing containing an opening, a driven rotatable disc cooperating with said flange and dividing said casing into low and high pressure chambers connected by said opening, said chambers being in the form of flat spirals increasing in area in the direction of rotation of said disc, and impeller blades on both sides of said disc in close running contact with the adjacent walls of said casing for setting up differential pressure in said chambers, the cooperating edges of said flange and disc being beveled and sloping outwardly into said high pressure chamber whereby to prevent leakage from the high to the low pressure chamber.

WILLIAM HARPER, Jr.